United States Patent [19]
Domiteaux

[11] Patent Number: 5,959,281
[45] Date of Patent: Sep. 28, 1999

[54] INTERACTIVE CARD READING SYSTEM

[75] Inventor: Mark R. Domiteaux, Dallas, Tex.

[73] Assignee: Lulirama International, Inc., Dallas, Tex.

[21] Appl. No.: 08/796,979

[22] Filed: Feb. 7, 1997

[51] Int. Cl.⁶ .................................................... A63F 1/00
[52] U.S. Cl. .................... 235/454; 235/375; 235/486; 235/494; 434/311
[58] Field of Search ................................. 235/454, 375, 235/494, 486; 434/311

[56] References Cited

U.S. PATENT DOCUMENTS

| | | | |
|---|---|---|---|
| 3,970,803 | 7/1976 | Kinzie, Jr. et al. | 179/100.3 |
| 4,534,562 | 8/1985 | Cuff et al. | 273/149 P |
| 4,570,250 | 2/1986 | Gabritsos et al. | 369/97 |
| 4,673,357 | 6/1987 | Ito | 434/311 |
| 4,681,548 | 7/1987 | Lemelson | 434/311 |
| 4,729,564 | 3/1988 | Kuna et al. | 273/1 |
| 5,045,327 | 9/1991 | Tarlow et al. | 381/51 |
| 5,067,713 | 11/1991 | Soules et al. | 273/149 P |
| 5,101,096 | 3/1992 | Ohyama et al. | 235/436 |
| 5,330,380 | 7/1994 | McDarren et al. | 446/397 |
| 5,360,217 | 11/1994 | Taylor | 273/459 |
| 5,407,204 | 4/1995 | Meyer, III | 273/244 |
| 5,411,259 | 5/1995 | Pearson et al. | 273/93 C |
| 5,433,035 | 7/1995 | Bauer | 40/124.1 |
| 5,480,156 | 1/1996 | Deoderlein et al. | 273/237 |
| 5,511,980 | 4/1996 | Wood | 434/169 |
| 5,533,124 | 7/1996 | Smith et al. | 380/4 |
| 5,588,678 | 12/1996 | Young | 283/67 |
| 5,641,164 | 6/1997 | Deoderlein et al. | 273/237 |
| 5,671,555 | 9/1997 | Fernandes | 40/124.03 |
| 5,718,336 | 2/1998 | Haarlander | 206/542 |
| 5,748,731 | 5/1998 | Shepard | 380/4 |
| 5,768,223 | 6/1998 | Li et al. | 369/31 |
| 5,841,878 | 11/1998 | Arnold et al. | 381/124 |

*Primary Examiner*—Thien M. Le
*Assistant Examiner*—Douglas X. Rodriguez
*Attorney, Agent, or Firm*—Gardere & Wynne. L.L.P.

[57] ABSTRACT

The present invention is an interactive system for reading cards. The system comprises a card bearing an image and encoded information and a talking hand-held card reader for reading the encoded information on the card and playing back an audible message associated with the image or encoded information. In one aspect, the invention is also a talking hand-held card reader having a housing which is shaped to resemble a person, place, aspect or thing associated with the image or encoded information on the card being read.

19 Claims, 8 Drawing Sheets

INTERACTIVE CARD READING SYSTEM

FIELD OF THE INVENTION

The present invention relates generally to cards and card readers and, more specifically, to cards bearing encoded information and to a talking hand-held card reader for reading the encoded information on the card and playing back an audible message.

BACKGROUND OF THE INVENTION AND DESCRIPTION OF THE PRIOR ART

Collectible items, in particular trading cards for athletes, musicians and other celebrities, continue to provide trading card enthusiasts entertainment and the potential for monetary gain. These cards have been available since the turn of the century and typically display an action photograph or other image, of for example an athlete, on the front face of a card and statistics and other personal information on the back face of a card. Collecting trading cards is a popular hobby engaged in by both children and adults.

In recent years, collecting trading cards has increased in popularity. Card manufacturers have responded to this increase in popularity by introducing innovations such as holographic logos and gold plated collector sets. However, potential sports trading cards have typically been passive, and the information provided thereon has remained relatively constant over the years.

Efforts have been made to improve the level of interaction between a trading card collector and a trading card. U.S. Pat. Nos. 5,480,156 to Doederlein et al. and 5,433,035 to Bauer disclose talking trading cards which are activatable by either squeezing the card or touching a front surface of the card.

U.S. Pat. No. 5,282,651 to Alonso covers a trading card having a thermochromic coating material which is responsive to temperature change so that a user can change the appearance of the image on the trading card by rubbing the coating with his fingers.

Other efforts at improving the interaction between a collector and his trading cards have included developing board games which employ the trading cards. Such board games are disclosed in U.S. Pat. Nos. 5,407,204 to Meyer, 5,360,217 to Taylor and a variety of other patents.

A video sports game employing trading cards bearing encoded information has been developed. U.S. Pat. No. 5,411,529 to Pearson et al. discloses a video game system comprising five separate electronic devices that are hard wired together: the first being a card reader, the second a control system, the third a monitor and the fourth and fifth being two control elements that allow a player to interact with the control system and thus play the video game.

Cards bearing coded information are known. One particular application is coded playing cards. U.S. Pat. Nos. 5,067,713 to Soules et al. and 4,534,562 to Cuf et al. are directed to apparati for dealing coded cards. Other known applications are coded gaming tickets, business cards, transaction cards, security cards and identification cards.

Although not related to trading cards, U.S. Pat. No. 5,330,380 to McDarren is directed to an audible message/information delivery system. In particular, the patent discloses a system comprising a speaker, processing means, an activating switch, a microprocessor, and an input zone for reading coded information disposed on a toy selected from the group consisting of toy vehicles, dolls, stuffed animals, airplanes and action figures. When a user places a toy bearing a coded message on the input zone of the system, the system will play back an audible message associated with that toy.

A wide variety of other card readers are known for reading information encoded on metallic or magnetic strips, heat sensitive material and the like disposed on cards. Such readers are generally complex and require components that are not readily portable or require more than one component to perform desired operations. Such readers have been employed as stationary units at automatic bank tellers, entrances and exits to secured areas, retail and storage facilities, store check-out counters and more. Known electro-optical card readers typically require high technology equipment such as lasers and extensive computer controls. However, no card reader systems exist that employ simple electro-optical components assembled into a hand-held, talking card reader.

Thus, although toys and cards bearing encoded information are known, there is no teaching or suggestion in the prior art of the particular combination of a card and card reader as described and claimed herein. A need remains for interactive card systems useful in a broad range of applications.

OBJECTS OF THE INVENTION

Known card and card reader systems have the disadvantages of either not being portable, requiring plural separate components, being too large to be hand-held, being limited to reading cards having specific sizes and shapes, not being readily adaptable for use in a variety of applications or requiring expensive or complicated electronic components. It is an object of the invention to provide an improved card and card reader system that overcomes the disadvantages of known systems.

The card reading system of the invention has a broad spectrum of contemplated applications. Thus, one object of the invention is to provide a card reading system that is easy to use, simple, portable, or comprises a single component hand-held reader which is inexpensive, easy to manufacture, interactive and readily modifiable for specific applications and is constructed with simple electro-optical components. The present system is also not limited to reading cards having specific sizes and shapes. The present card reader does not employ lasers.

It is another object of the invention to provide a card reader system that employs information encoded in binary format thereby simplifying the design requirements of a card bearing the encoded information and a card reader operable to read the encoded information.

It is also an object of the invention to provide an interactive trading card system that provides a user a greater level of interaction with his cards and thus greater enjoyment than is obtained from the cards alone.

SUMMARY OF THE INVENTION

One aspect of the present invention comprises, in combination, a card and a talking hand-held card reader. The card bears encoded information, which can be either visible or invisible to or imperceptible by the naked eye, and an image associated with the encoded information. The talking hand-held card reader comprises a speaker, an electrical power source, a control unit, an electro-optical reading unit for reading the encoded information on the card, a non-volatile memory, and a housing within which all of the electronic components of the reader are disposed. The housing also has a slot through which the portion of a card that bears encoded information can be placed and subsequently read by the electro-optical reading unit. The talking hand-held card reader will read the encoded information from the card and in response generate an audible message associated with the image or encoded information on the card.

The present interactive hand-held card reader is simple to operate, requires inexpensive and simple electronic components, is designed for low technology applications, is readily modified for a variety of applications and provides a user a high level of interaction with his cards and thereby enhanced entertainment.

Thus, in one embodiment, the present invention is an interactive card reading system comprising, in combination:

a card bearing an image and encoded information; and a talking, hand-held, single component card reader comprising:

a housing having a surface defining a slot for receiving said card;

a sound chip comprising a non-volatile memory for storing a prerecorded message associated with the image or encoded information borne by said card;

a sound generating unit disposed within the housing for audible play-back of the prerecorded message associated with the image or encoded information borne by said card;

an electro-optical reading unit disposed adjacent the surface defining a slot in said housing for reading the encoded information on said card;

a control unit disposed within the housing and operably connected to said sound generating unit, said electro-optical reading unit, and said sound chip for decoding encoded information read by said electro-optical reading unit, for retrieving from said non-volatile memory the prerecorded message associated with the image or encoded information borne by said card and read by said electro-optical reading unit, and for initiating play-back of the prerecorded message by said sound generating unit; and an activating switch associated with said housing and operably connected to said control unit.

It is contemplated that the card can bear encoded information in a variety of formats and that the encoded information can be visible or invisible to or imperceptible by the naked eye.

The card reader can further comprise additional non-volatile memory which is not part of the sound chip. It is also contemplated that the housing of the card reader can further comprise a removable portion which can house or provide access to removable non-volatile memory and/or sound chips, since the non-volatile memory and sound chips can be permanent components of or can be removable from the card reader.

It is also contemplated that either a portion of or the entire housing of the reader can be configured so as to completely or partially assume the form of or resemble an aspect, person, place or thing associated with the image on a card being read.

Thus, the present invention is also a talking, hand-held, single component card reader for reading encoded information on a card, the card reader comprising:

a housing having a surface defining a slot for receiving the card;

a sound chip comprising a non-volatile memory for storing a prerecorded message associated with the encoded information on the card;

a sound generating unit for audible play-back of the prerecorded message;

an electro-optical reading unit disposed adjacent the surface defining a slot for reading the encoded information on the card;

an activating switch for initiating operation of said talking hand-held card reader; and a control unit operably connected to said sound generating unit, said electro-optical reading unit, said sound chip and said activating switch for decoding the encoded information on the card, for retrieving from said non-volatile memory the prerecorded message associated with the encoded information on the card, and for initiating play-back of the prerecorded message by said sound generating unit;

said housing having a permanent or removable portion which shape or appearance is associated with some aspect of the card being read.

The present invention also contemplates that the talking, hand-held, single component card reader can be used to read encoded information from TAZO™ (disc-shaped) connectors, pogs, gaming cards, tickets, price or inventory tag, stubs or receipts, game pieces, business cards and other similar objects or collectible items having a substantially planar structure.

Other features, advantages and embodiments of the invention will be apparent to those skilled in the art by the following description and appended claims.

BRIEF DESCRIPTION OF THE DRAWINGS

The following drawings are part of the present specification and are included to further illustrate certain aspects of the invention. The invention may be better understood by reference to one or more of these drawings in combination with the detailed description of the specific embodiments presented herein.

DETAILED DESCRIPTION OF THE INVENTION

In one aspect, the present invention comprises, in combination: a card bearing an image and encoded information associated with that image; and a hand-held, single component card reader for reading the encoded information borne by the card and for playing an audible sound in response thereto.

Figure 1:
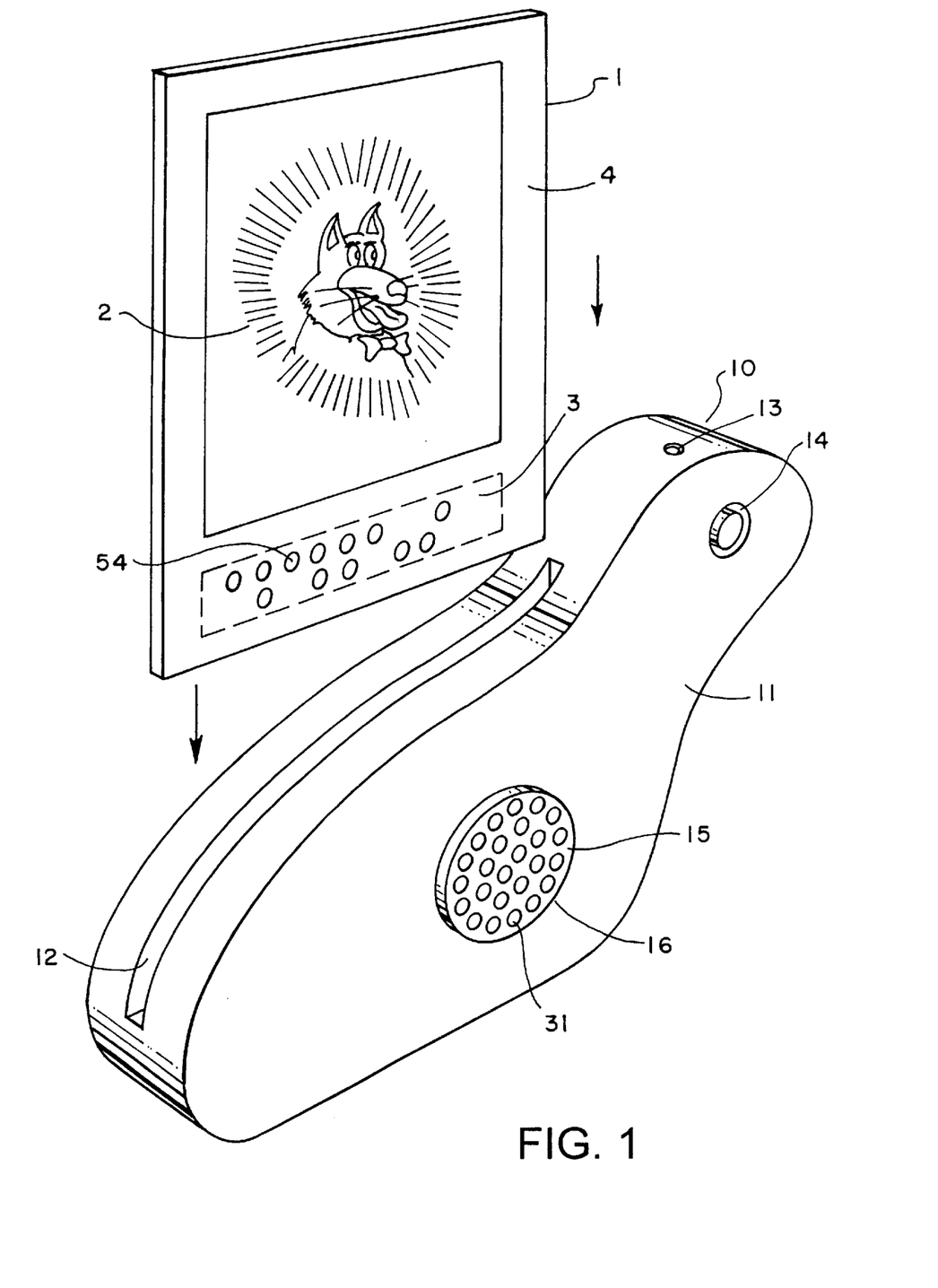
FIG. 1. Perspective view of a first embodiment of the interactive card reading system of the invention.

Referring to FIG. 1, trading card (1) bears image (2) and encoded information (54) in region (3) on front surface (4). Hand-held, single component card reader (10) comprises housing (11), sound generating unit (16), optional indicator (13) and slot (12). After trading card (1) is placed in slot (12), activating switch (14) causes card reader (10) to play back an audible message associated with image (2) on trading card (1) by way of sound generating unit (16).

The Card

As used herein, the term "card" includes collectible cards, trading cards, gaming cards, business cards, post-cards, price tags, inventory tags, tickets, receipts, coupons, note cards, stubs, pogs, TAZO™ connectors and like items. The cards of the invention are generally planar in construction. Cards contemplated by the invention can be made of paper, cardboard, paperboard, plastic, rubber, film, cellulose based materials, starch based materials, metal or any combination or equivalent thereof. Such cards are widely available.

The cards of the invention can be prepared from existing cards by placing encoded information and/or images, as described below, on the card. Otherwise, the cards of the invention can be manufactured directly using currently available equipment and processes.

"Trading card" refers to a collectible card such as baseball cards, football cards, basketball cards, golf cards, rock star cards and the like. Referring again to FIG. 1, a trading card (1) contemplated by the invention bears an image (2) on a front surface (4). The image on the card can be any such image of interest to a trading card collector such as text and/or images of athletes, musicians, historical or geographical locations, icons, politicians, symbols, celebrities, animals, cartoons or combinations thereof and the like. Image (2) can also be a 2-dimensional image or a 3-dimensional image. The 3-dimensional image can be from a holographic source or other such type medium which will generate a 3-dimensional image when viewed.

By "encoded information" is meant information that is machine readable such as by the electro-optical reading unit of the hand-held card reader of the invention. The encoded information, in one aspect, will be associated with an image disposed on the card. For example, the encoded information can be decoded by the hand-held card reader to generate an audio clip from a television or radio broadcast featuring the person, place or thing whose image is disposed on a card being read. The prerecorded message in the non-volatile memory can be any audible sound or combination of sounds. The encoded information need not be associated with the image on the card. For example, it may be desirable to use encoded information that would indicate prize eligibility status of a person possessing a card of the invention.

As many different types of cards and applications are contemplated by the invention, the encoded information borne by the card can be personal, public, statistical, musical, lyrical or text or can be related to a celebrity, money, prize eligibility, price, security, identification, business, religion, and anything else. In essence, the scope of the type of information to which the encoded information is associated is unlimited.

A card according to the invention will bear encoded information on any region which is accessible to the card reader of the invention. In the exemplary embodiment shown in FIG. 1, encoded information (54) is disposed on a lower front portion defined by region (3) of trading card (1). Encoded information (54) can be laid out in many different configurations. It need not be laid out, as depicted in FIG. 1, in a linear configuration that matches the layout of corresponding electro-optical sensors (30) of FIG. 2a.

The encoded information can be, but need not be, visible or discernible by the naked eye. Thus, a variety of formats for the encoded information can be used and are contemplated by the invention. The encoded information will be read by an electro-optical reading unit which can operate either within or outside the visible wavelength range, where the visible wavelength is considered to be about 400 to about 700 nanometers. When above 700 nanometers, the encoded information can be read by an electro-optical reading unit sensitive to light in the wavelength range above about 700 nanometers but below about 2,200 nanometers, preferably in the infrared (IR) range from about 800 nanometers to about 2,000 nanometers.

The encoded information, when not visible to the human eye, can be read by an electro-optical reading unit that operates in the ultraviolet (UV) or infrared wavelength ranges. It is necessary that the encoded information be selected in a format that will be readable by a respective hand-held card reader. More specifically, Table 1 lists, by way of example and without limitation, some of the various combinations of light source, appropriate electro-optical reading unit (detector) and the optical response which is monitored as contemplated by the invention.

TABLE 1

| Source | Detector | Optical Response |
| --- | --- | --- |
| IR | IR | Differential reflectivity, transmissivity or long wave length fluorescence |
| visible | IR | fluorescence |
| visible | visible | reflectivity or transmissivity |
| UV | visible | fluorescence |
| UV | UV | reflectivity or transmissivity |

In the preferred embodiment, the encoded information will be readable by an electro-optical reading unit responsive to light in the visible or infrared (IR) wavelength range. The encoded information can be in the form of a bar code, dot code (FIGS. 1 and 7), gray scale and other similar formats. Although the encoded information can be visible to the naked eye, it need not be discernible to the naked eye. Thus, encoded information can be made a part of and can be masked by an image on the card. It is generally intended that the encoded information will be encoded in a binary format readable by the electo-optical reading unit.

In yet another embodiment, the encoded information can employ materials that produce a phosphorescent signal that can be read by the electro-optical reading unit. The encoded information need not be disposed on the front surface of the card. Thus, the encoded information can be on any surface of the card, embedded within the card, covered by a laminate on a surface of the card or be masked by an image on the card.

The Hand-Held Card Reader

The hand-held card reader of the invention is a portable, independent and stand-alone unit, i.e., it does not require other external electronic equipment in order to operate independently. Thus, the hand-held card reader is a single component or unit.

There are many applications for the card reading system contemplated by the invention. For example, a user could carry a hand-held card reader through a store and read encoded information on the tag of an article and immediately obtain an audible message related to that product. Or, a user could purchase a gaming card bearing encoded information, read the card with the talking hand-held card reader and immediately obtain an audible message regarding prize eligibility.

In another example, as shown in FIG. 1, trading card (1) bearing encoded information (54) is read by talking hand-held card reader (10) which, in response, plays an audible message regarding canine performance, history or genealogy.

Other non-limiting and exemplary applications for the card reader of the invention include: minimum security control, such as to limit access to a particular area; and purchase or inventory control, such as to permit a user to order a product in a first area and receive the product in a second area.

Referring again to FIG. (1), hand-held card reader (10) comprises housing (11), activating switch (14), slot (12), sound generating unit (16) and other components not shown.

Figure 2A:
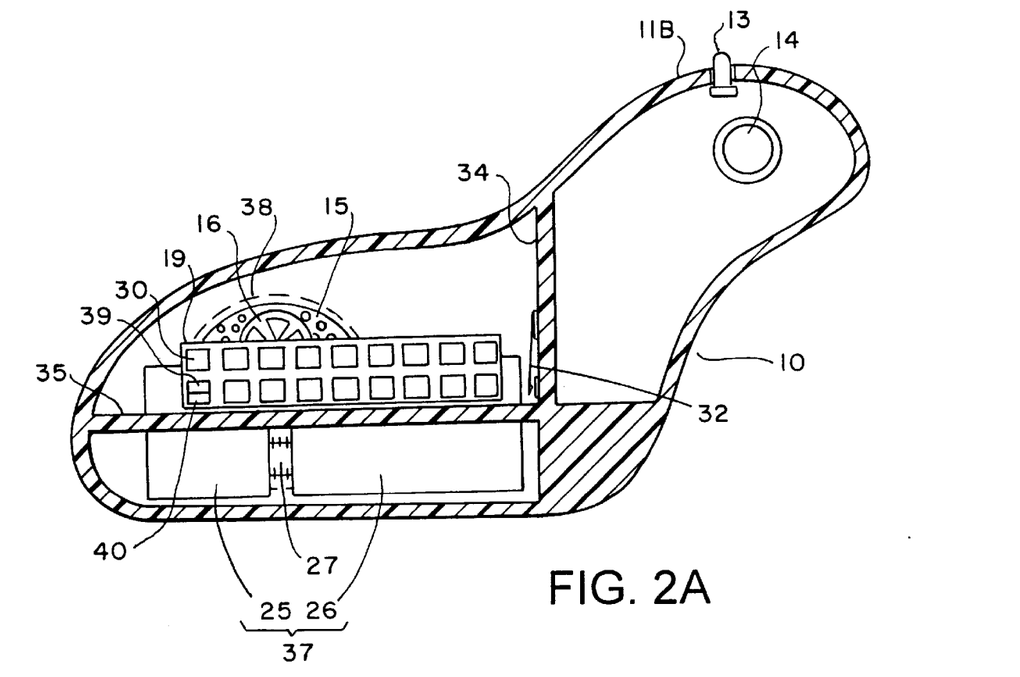
FIGS. 2a and 2b. Cross-sectional views of a second embodiment the hand-held, talking, single component card reader of the invention.
Figure 2B:
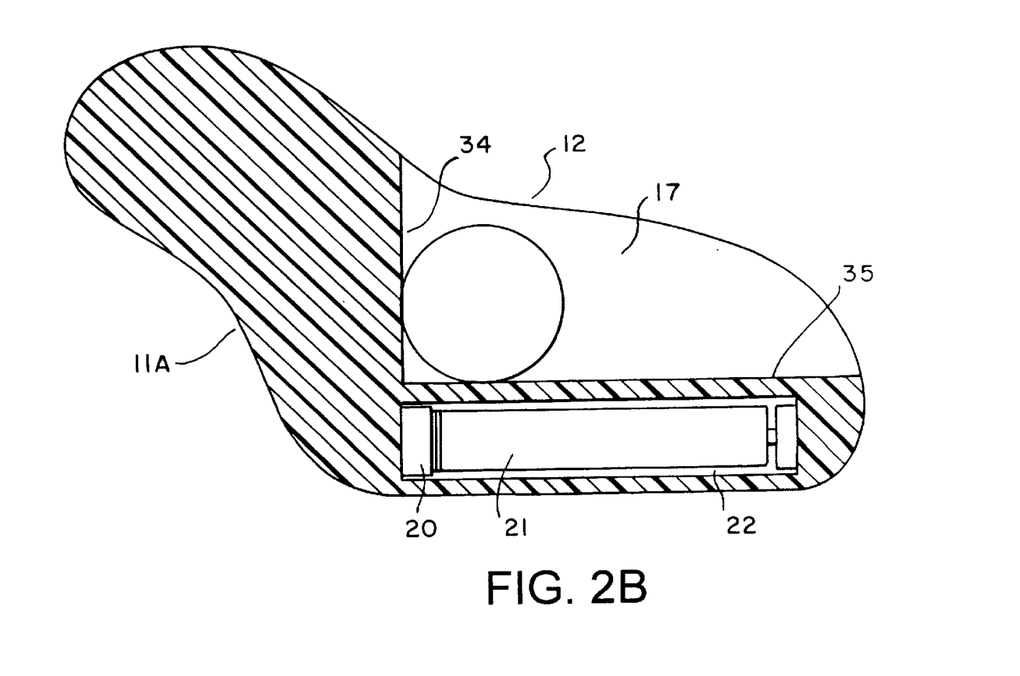
Figure 3A:
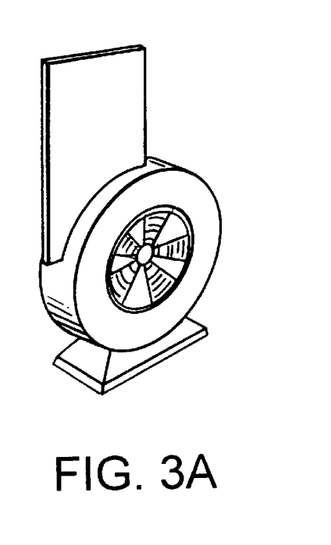
FIGS. 3a–3f. Perspective view of six different embodiments of the housing for the hand-held card reader of the invention.
Figure 3B:
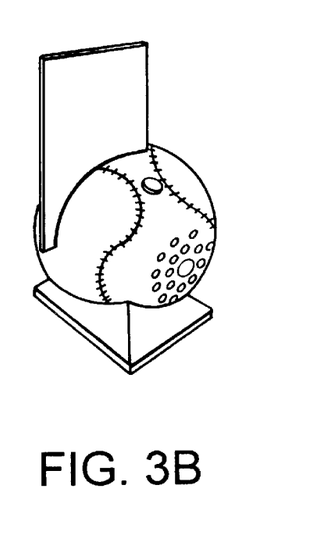
Figure 3C:
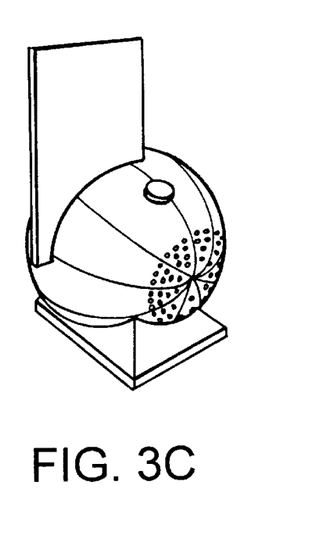
Figure 3D:
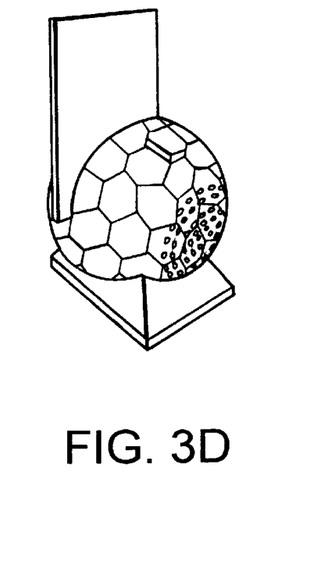
Figure 3E:
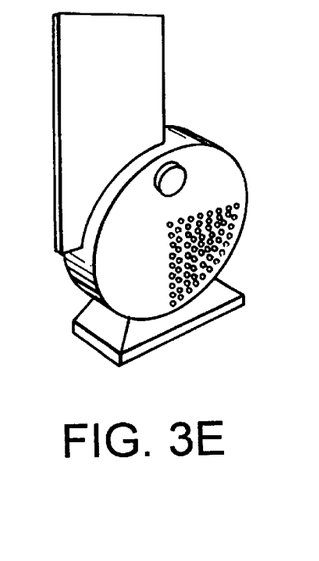
Figure 3F:
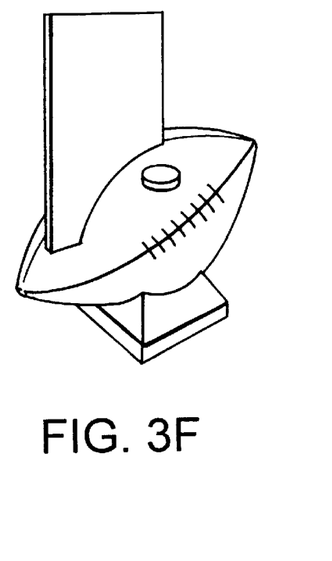

Housing (11) has a slot for receiving a card bearing encoded information. As shown, slot (12) can be adapted to receive one or a plurality of cards; however, it is preferable that it be adapted to receive one card at a time. Slot (10) can also include a variety of associated recesses of different shapes to permit reading of cards of different constructions. For example, a given reader will be able to read information from a trading card and a pog (or bottle cap) according to the design of the slot and associated recesses included in the reader. FIG. 2b, depicts associated recess (36) in slot (12) which is adapted to receive a pog or TAZO™ connector. Thus, the present reader is not limited to reading cards of any specific size or shape provided the card is substantially planar.

The slot in the housing can be adapted to closely fit and receive the portion of the card which bears encoded information. As shown in FIGS. 2A and 2B, slot (12) will be defined by back surface (34), bottom surface (35) and side surface (17). Surfaces (34), (35) and (17) cooperate to receive a card in a manner to permit reading of encoded information by electro-optical reading unit (19). Slot (12) can be disposed anywhere desired in housing (11).

According to FIGS. 1, 2a and 2b, the housing of the hand-held card reader can be shaped as desired. Referring now to FIGS. 3a–3f, the housing of the hand-held card reader can be shaped in the form of any person, place, aspect or thing associated with a card being read by a respective hand-held card reader. Thus, either the shape or appearance of either a portion of the housing or the entire housing can be associated with some aspect of the card being read.

Accordingly, the housing of the hand-held card reader can be shaped, by way of example and without limitation, as a football (FIG. 3f), a baseball (FIG. 3b), a hockey puck (FIG. 3e), a basketball (FIG. 3c), a fish and lure, a vehicle such as the BATMOBILE™ from the BATMAN and ROBIN television and movie series (FIG. 7), a soccer ball (FIG. 3d), a tire (FIG. 3a), a golf club head and ball and other such objects. In each of these figures, a vertically disposed rectangular card is shown inserted into a card reader of the invention.

The housing of the hand-held card reader can also be made to resemble some aspect associated with the image or encoded information on the card being read by placement of a drawing, decal, etching, printed letter, symbol, or other similar graphic design on the surface of the housing. These embodiments are by no means comprehensive and should not be construed as limiting the invention to merely the recited embodiments. That is, for every group or type of trading card, there can be more than one associated embodiment for the shape or appearance of the housing of the hand-held card reader.

Figure 6A:
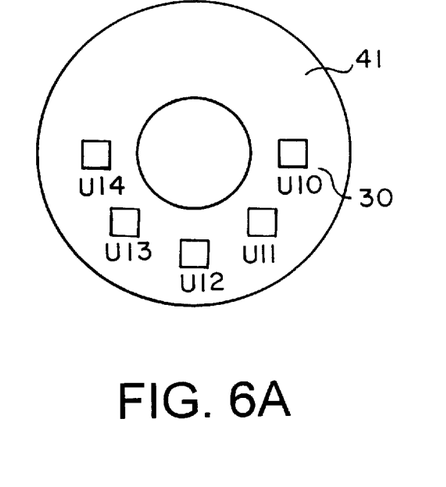
FIGS. 6a, 6b. Exemplary layouts of the electro-optical reading unit of the invention.
Figure 6B:
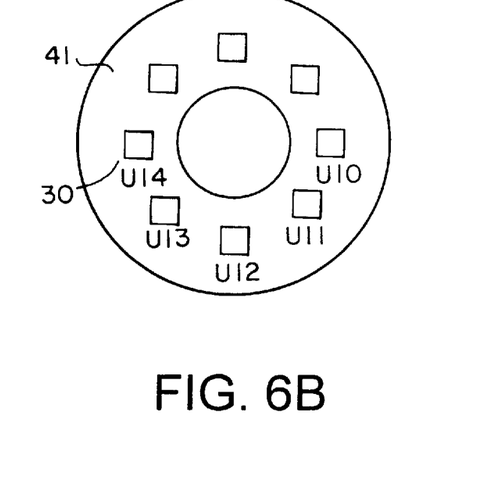
Figure 7:
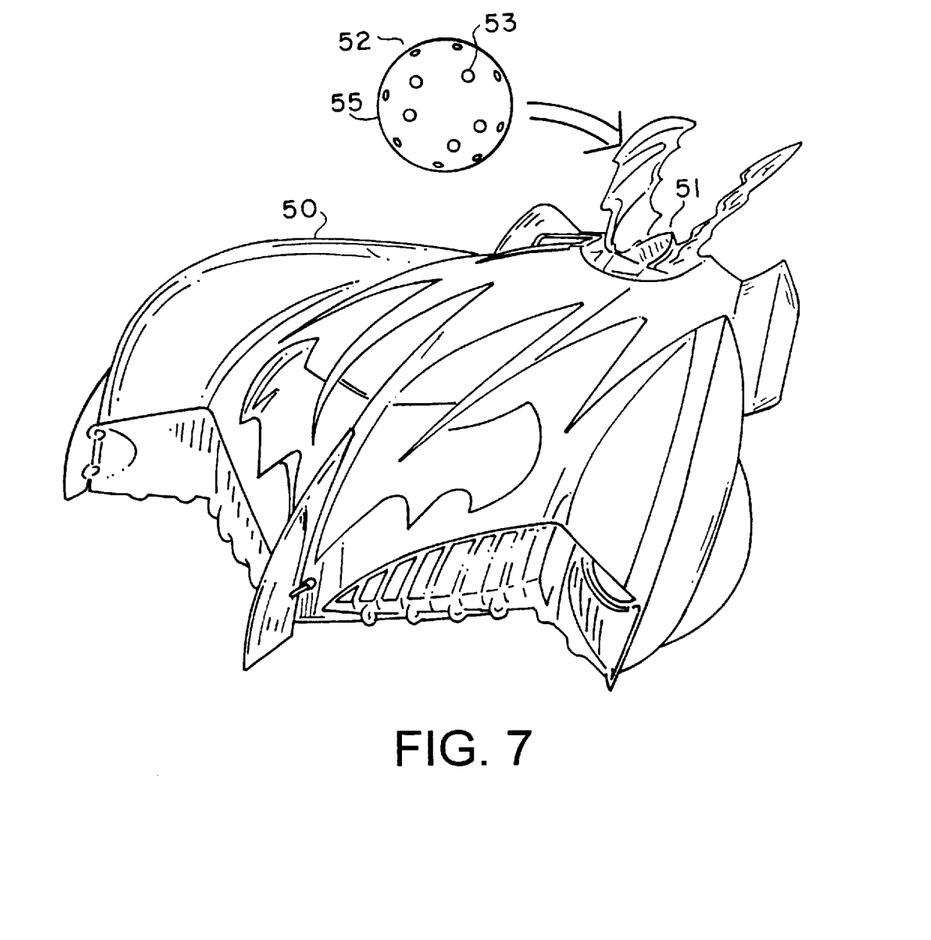
FIG. 7. A seventh embodiment of the hand-held card reader of the invention.
Figure 8A:
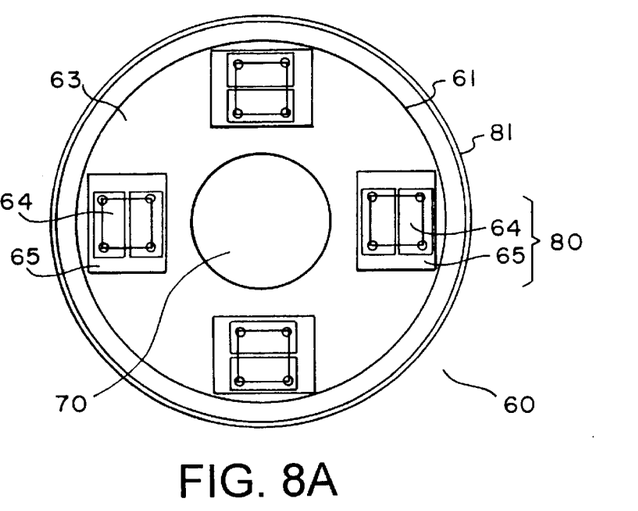
Figure 8B:
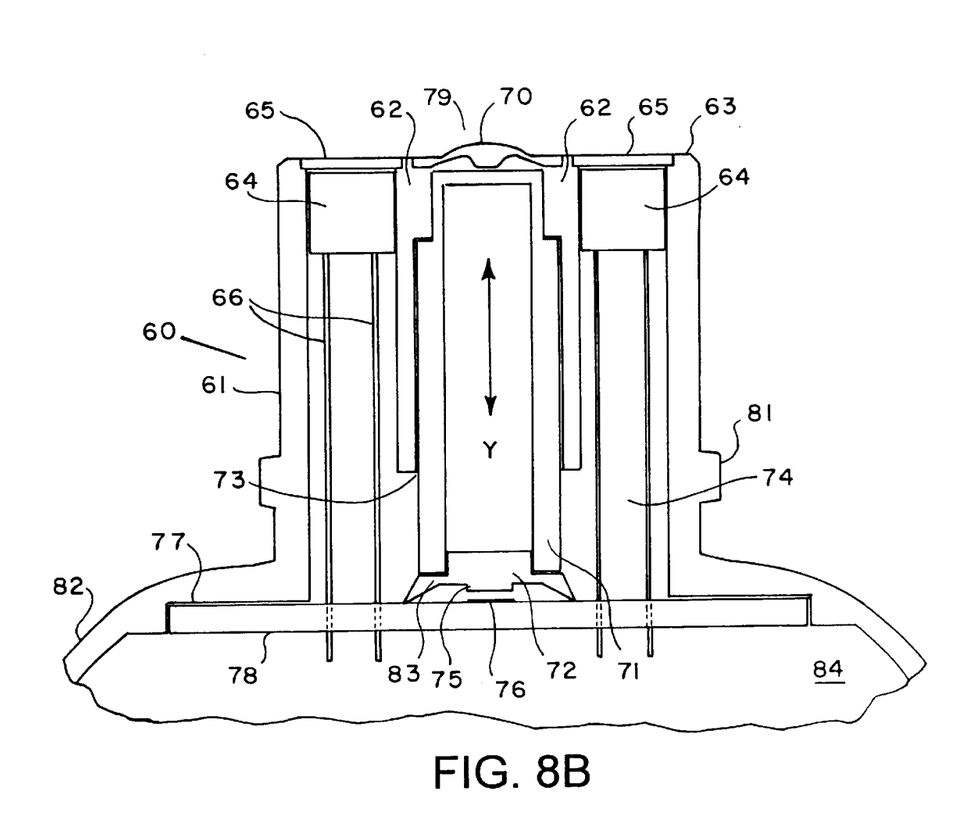
Figure 9:
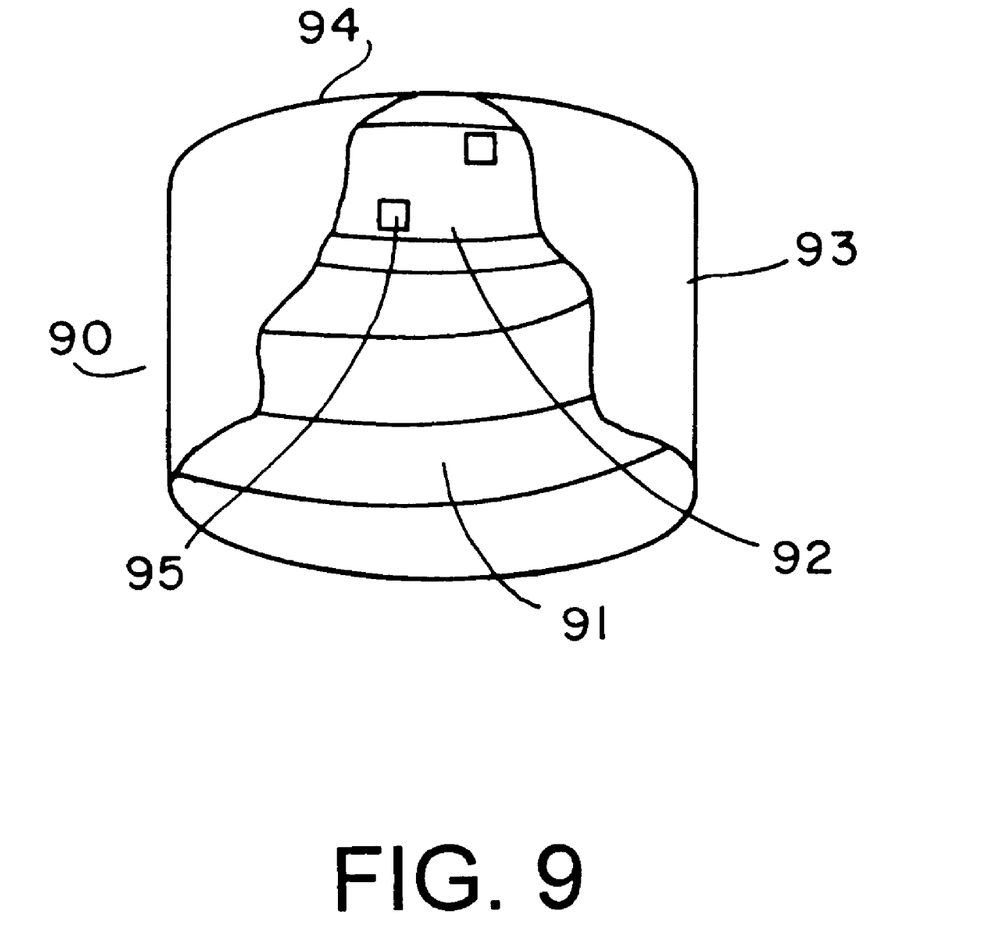

FIG. 7 depicts card reader (50) shaped like the BATMOBILE™ from the BATMAN and ROBIN television and movie series. In this particular embodiment, TAZO™ connector (52) bearing encoded information (53) and an image (not shown) is inserted into slot (51) which has associated recess (57, not shown). Corresponding electro-optical reading unit (58, not shown) is disposed adjacent slot (51) and recess (52). By employing the electro-optical sensor (30) layout of either FIG. 6a or 6b, TAZO™ connector (52) bearing encoded information (53) disposed radially adjacent outer periphery (55) can be read. It should be noted, that encoded information (53) is encoded in a binary format; although, other formats are contemplated by the invention. In other aspects, card reader (50) functions in substantially the same manner as card reader (10).

Referring again to FIG. 1, housing (11) of hand-held card reader (10) can have removable portion (15). In this particular embodiment, removable portion (15) comprises a cover for sound generating unit (16). Removable portion (15) can have perforations or holes (31) through which an audible signal generated by sound generating unit (16) can be heard. In the embodiment of FIG. 1, removable portion (15) has a circular shape; however, removable portion (15) can also have the shape of or resemble any accessory, article, person, place or aspect associated with image (2) or encoded information (54) borne by trading card (1). Thus, by way of example and without limitation, removable portion (15) can have the shape of a football when using hand-held card reader (10) to read trading cards (1) bearing football associated images (2). Likewise, as contemplated for the housings depicted in FIGS. 3a through 3f, removable portion (15) can assume the shape of accessories associated with baseball, hockey, basketball, soccer, fishing, golf, music, rock stars, art, cars, geography, history and the like. The removable portion of the housing need not be associated with the sound generating unit. Removable portion (15) can be any part of housing (11). There can also be plural removable portions.

Referring again to FIG. 1, hand-held card reader (10) can optionally comprise indicator (13) used to indicate one or a variety of functions performed by card reader (10). Thus, indicator (13) can indicate initiation of playback, insertion of a card into slot (12), battery power, termination of playback, or other such operation. For the embodiment where a card bears encoded information associated with prize eligibility, indicator (13) can emit an audible or visible signal indicating a prize having been won by a person possessing the card. Indicator (13), as shown in FIGS. 1 and 2a, is an LED; however, it can also be any other light source such as incandescent lamps, neon lamps, liquid crystal displays (LCD), vacuum fluorescent modules, cathode ray tubes (CRT) and electroluminescent lamps. In a preferred embodiment, indicator (30) is an LED. Where a light indicator in undesired, optional indicator (13) can be an audible signal generator.

When desired, the hand-held card reader of the invention can comprise an activating switch to initiate reading of encoded information on a card and play-back of a prerecorded message associated with the encoded information read. In the embodiment of FIG. 1, activating switch (14) is a push-button switch; however, activating switch (14) can be any suitable switch which will be responsive to a user of a hand-held card reader. Such switches include by way of example and without limitation, any conventional active or passive electrical device capable of conducting a signal in response to the approach or application of an external stimulus such as force, displacement, deformation, pressure, temperature, electromotive potential, electromagnetic radiation or magnetic field.

In the embodiment of FIG. 2a, the activating switch (14) can also cooperate with leaf switch (32), which itself can be considered an activating switch, to control operation of the hand-held card reader (10). Thus, when a card (not shown) is inserted and properly seated within slot (12), an edge of the card will abut leaf switch (32) thereby closing a circuit. After closure of leaf switch (32), activating switch (14) can be depressed by a user to initiate playback of a prerecorded message. In yet another embodiment of the invention, activating switch (14) is absent and operation of the hand-held trading card reader of the invention is controlled solely by leaf switch (32). Activating switch (14) can be disposed anywhere in housing (11). Likewise, leaf switch (32) when present can be disposed anywhere within or in close proximity to slot (12).

Although not shown, activating switch (14) can instead comprise an electro-optical sensor (30) which when approached by a card (not shown), will initiate operation of hand-held card reader (10). Thus, the activating switch as contemplated by the present invention can be, for example, a single contact switch, a double contact switch, a pushbutton, a temperature sensitive switch, a touch sensitive switch, a motion sensitive switch, a leaf switch, a light sensitive switch and a pressure sensitive switch.

The circuitry of hand-held card reader (10) can be designed so as to be responsive to either a momentary or continuous closure of activating switch (14) or leaf switch (32). Thus, in one aspect, activating switch (14) can be depressed momentarily to initiate complete play-back of a prerecorded message by hand-held card reader (10). In another aspect, activating switch (14) can be depressed continuously in order to completely play back a prerecorded message. In some of the embodiments contemplated by the present invention, a card (not shown) will need to be disposed and properly seated within slot (12) in order for the hand-held card reader to read the encoded information borne by the trading card and to subsequently play back a prerecorded message associated with the image borne by the trading card.

Referring still to FIG. 2a, sound generating unit (16) comprises a transducer and associated circuitry. The transducer can be any type of commercially available speaker. Sound generating unit (16) will play back an audible message that has been decoded by control unit (26) and stored within removable non-volatile memory (27) or sound chip (25). The audible message will be associated with the image and/or the encoded information borne by the card. Sound generating unit (16) is operably connected to the control unit (26) of the invention as described below.

The electro-optical reading unit of the invention will be capable of sensing and reading encoded information borne by a card. Referring to FIG. 2a, electro-optical reading unit (19) will be disposed in close proximity to slot (12) and will preferably face surface (17) which defines slot (12) of hand-held card reader (10). Electro-optical reading unit (19) will be disposed in such a manner as to permit reading of the encoded information from a card when said card is properly placed within slot (12) or associated recess (36) (FIG. 2b). Electro-optical reading unit (19) will be activatable by activating switch (14) or leaf switch (32) or it may be self-activating as by response to optically sensing the presence of a card in slot (12). Electro-optical reading unit (19) will be operably connected to control unit (26) and will transfer read encoded information to the control unit. It is contemplated that more than one electro-optical reading unit (19) can be disposed in close proximity to slot (12).

Electro-optical reading unit (19) can comprise one or more electro-optical sensors (30). In a preferred embodiment, electro-optical reading unit (19) will comprise a bank of electro-optical sensors (30) and will be able to read encoded information from a card either by sequentially scanning portions of the encoded information or by momentarily scanning all of the information at once. For example, hand-held card reader (10), comprising a minimal number of electro-optical sensors (30), can be used to scan encoded information on a card as the card is slid into slot (12) to its final proper position. In an alternative embodiment, hand-held card reader (10) will comprise numerous electro-optical sensors (30) which will read all of the encoded information on a card simultaneously after the card has been properly seated within slot (12) and electro-optical reading unit (19) has been activated.

The layout of plural electro-optical sensors (30) will determine the design of corresponding circuit board (41) upon which the sensors are mounted and the construction of a card which can be read by the card reader. FIG. 2a depicts one embodiment of the invention where electro-optical sensors (30) are laid out in a rectangular grid. This layout can be used to read encoded information disposed on a card in a corresponding rectangular configuration. FIG. 6a depicts another embodiment where electro-optical sensors (30) are laid out in a semi-circular configuration. FIG. 6b depicts yet another embodiment where electro-optical sensors (30) are laid out in a circular configuration. This embodiment is useful for reading encoded information (53) on TAZO™ connector (52) depicted in FIG. 7. The invention is not limited to a particular layout for the electro-optical sensors.

Electro-optical reading unit (19) can be responsive to light in the human eye visible and invisible wavelength ranges. Thus, the present invention contemplates that electro-optical reading unit (19) will be able to operate in the ultra-violet, visible, near infrared, normal infrared and far infrared wavelength ranges. It can also be responsive to fluorescent or phosphorescent light sources. Electro-optical reading unit (19) will operate in either a light transmissive, light reflective or light absorptive reading mode, i.e., electro-optical sensors (30) will be able to sense light that has been reflected from a surface on the card or light that has been passed through the trading card or light that has been absorbed by the trading card.

According to the particular electro-optical sensor (30) employed, electro-optical reading unit (19) can also be made to serve as its own light source. For example, in a preferred embodiment, the electro-optical sensor is an IR reflective opto-sensor such as those available from Q.T. Optoelectronics (Sunnyvale, Calif.). These sensors have a two-part construction. The first part (39) emits IR light, while the second part (40) detects the reflected corresponding IR light.

When electro-optical unit (19) senses light that has been transmitted through a card, it will be necessary to have an appropriate light source disposed opposite electro-optical unit (19) on surface (17) of slot (12).

The appropriate combination of material used for making the encoded information on a card and the respective electro-optical sensor (19) will be required. For example, when the encoded information is visible to ultra-violet light, then an electro-optical sensor (30) which senses ultra-violet light will be used. The same will be true for all light wavelength ranges contemplated by the invention and described above.

Hand-held card reader (10) will require non-volatile memory for storage of prerecorded messages associated with an individual or particular group of cards. The information stored in the non-volatile memory will be retrievable by control unit (26) and will be played back by sound generating unit (16). The non-volatile memory is an integral part of sound chip (25) and can further comprise additional non-volatile memory (27) which is not an integral part of sound chip (25). Sound chip (25) can be a digital EEPROM coupled with an analog-to-digital (A/D) converter for storage of byte-wide data, or an analog EEPROM for storage of analog data received from the sound recording unit into an integral non-volatile memory.

In a preferred embodiment, sound chip (25) is an EEPROM sound chip, such as manufactured by Information Storage Devices (ISD). Such ISD sound chips comprise a central processing unit or microprocessor and an analog non-volatile memory. Such devices, when coupled with a digital to analog converter, are capable of receiving digital information and storing it in analog format and subsequently retrieving the analog formatted information which is converted by sound generating unit (16) into an audible signal. Sound chip (25) is also capable of directly storing analog data.

When not an integral part of the sound chip, non-volatile memory contemplated by the invention can be any suitable commercially available non-volatile memory storage device. Such memory units include, by way of example and without limitation, a non-volatile RAM (NVRAM) which can be an ultra low-power CMOS SRAM with a long-life lithium power source for 10 year data retention. The memory is operably connected to control unit (26) and serves to store sounds or messages. Even more recently, non-volatile random access memories (NVRAMs) have been developed that combine a conventional high speed volatile memory with a back-up EEPROM that is loaded with the volatile memory data in case of a loss of power. Such NVRAMs are manufactured by Intel Corporation under the designation 2004. Although the memory capacity of the 2004 is substantially in excess of the capacity needed, the NVRAM technology can be a suitable choice for use in the hand-held card reader of the invention.

The term "non-volatile memory" means that code information in the memory will be retained in the memory unit even if electrical power is temporarily lost. Another type of useful non-volatile memory is the well known electronically programmable read only memory (EPROM). These silicon chips allow the user to load a limited number of bits into a non-volatile memory. Once a bit is loaded, however, it can never be changed, although the bit can be ignored and a new bit can be electronically entered. In time, the memory capacity of the EPROM, typically 4,000 to 64,000 bits, will be fully consumed. This type of memory would be satisfactory for the hand-held card reader.

As depicted in FIG. 2a, the non-volatile memory in the card reader can be removable by a user of the card reader. When it is removable, the user can remove either non-volatile memory (27) or sound chip (25). When a removable non-volatile memory is employed, it can be replaced with other non-volatile memory devices containing another group or series of prerecorded messages. The removable non-volatile memory (27) can comprise a part of removable portion (15) of hand-held card reader (10). Alternatively, it can comprise another removable portion of housing (11). In another embodiment, the removable non-volatile memory will be accessible to a user after removal of a removable portion of the housing of card reader (10).

In a preferred embodiment, removable portion (15) is associated with a particular group of cards, and removable non-volatile memory (27), having prerecorded messages associated with the same group of trading cards, can be attached to or made available with said removable portion (15). In this manner, hand-held card reader (10) can be adapted for use with various different groups of cards while requiring minimum modification to the reader itself. Thus, a person collecting cards can also collect removable portions (15) with associated removable non-volatile memory (27).

When the non-volatile memory is removable, it can be constructed to detachably plug into a circuit board of the invention. Many constructions for removable memory are known to the skilled artisan, and all such embodiments are contemplated herein.

Figure 4:
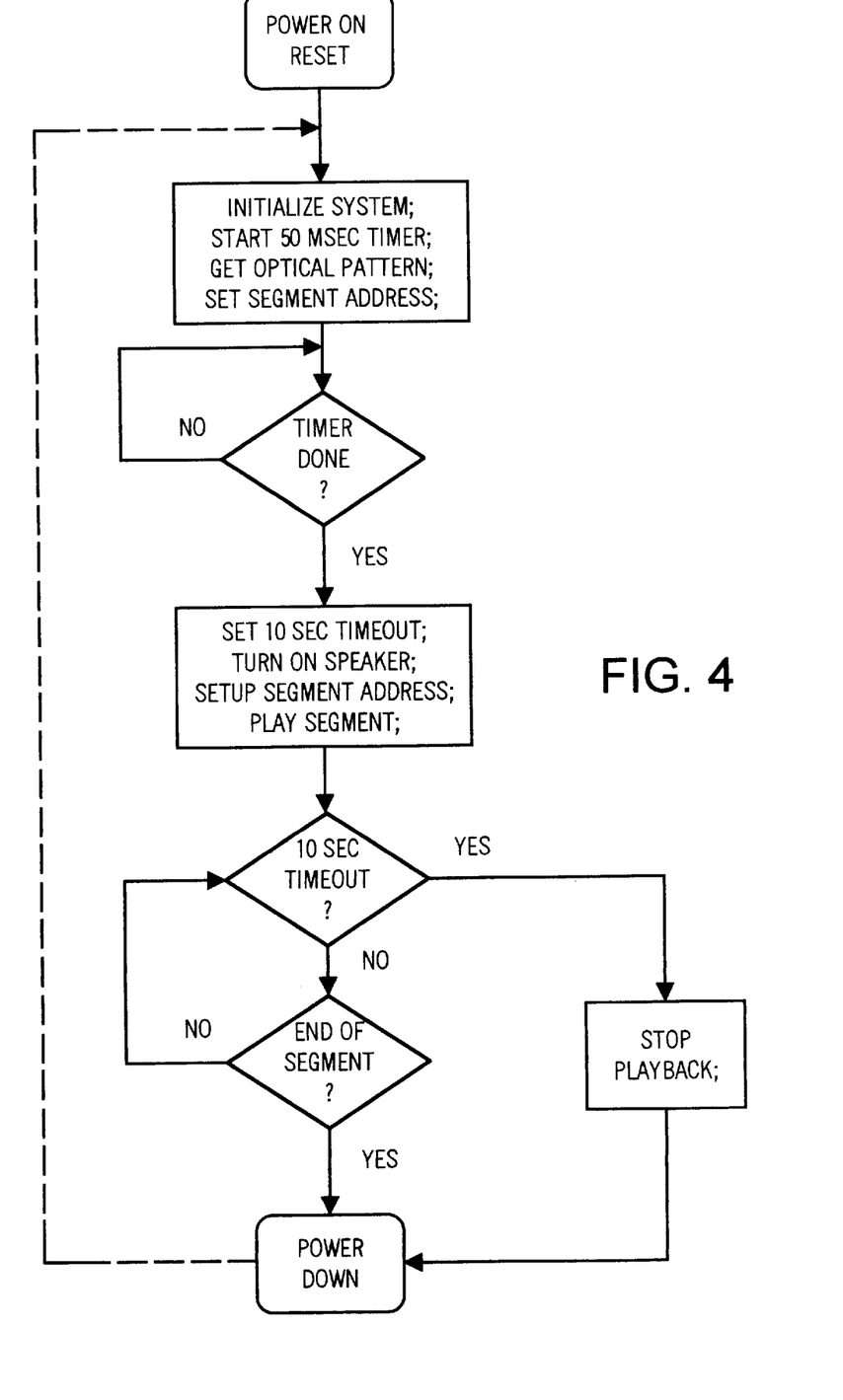
FIG. 4. Logic flow chart for the control program of one embodiment of a microprocessor used in the card reader.

The non-volatile memory will be able to retain numerous independent uniquely addressed messages where each message can be associated with a particular activation code embodied in the encoded information disposed on a card. FIG. 4 depicts, a multi-step flow chart for one embodiment of the program used to run control unit (26). In Step 1, card reader (10) is powered up when a card bearing encoded information is placed within slot (12) of hand-held card reader (10) and activating switch (14) is momentarily depressed. Control unit (26) is initialized and an internal timer is started. Electro-optical reading unit (19) is then activated, and the encoded information is read. The information is decoded by control unit (26) and decoder (44) by determining the address of a particular memory segment in the non-volatile memory of sound chip (25) that should be accessed. The internal timer is then reset to control duration of play-back of a recorded message. Sound generating unit (16) is activated, and the appropriate message stored in the corresponding non-volatile memory segment in sound chip (25) is played until the first of either time limit expiration or message completion occurs. Card-reader (10) then powers down until next use.

Sound chip (25) itself comprises a microprocessor and a non-volatile memory. Such sound chips are capable of storing and independently retrieving numerous messages. However, a separate control unit (26) is required by the invention to decode the encoded information and control operation of the card reader.

In one embodiment, control unit (26) comprises sound discrete logic for storing and retrieving prerecorded messages and for controlling operation of the reader. In a second embodiment, control unit (26) comprises direct mapping circuitry and non-volatile memory (27). In a third embodiment, control unit (26) comprises a microprocessor. In a fourth embodiment, control unit (26) comprises a microprocessor and a decoder.

The control unit of the invention is operably connected to electro-optical reading unit (19), sound generating unit (16), activating switch (14) and power source (20). Control unit (26) can comprise any commercially available microprocessor which will operate the card reader and associated components as described herein. Such microprocessors can be custom manufactured or are commercially available from a wide variety of sources listed below.

Operation of hand-held card reader (10) will require an electrical power source (20). Such source can be an individual battery or plural batteries (21) or a rechargeable electrical power pack. Power source (20) can be disposed anywhere within housing (11). In a preferred embodiment of the invention, power source (20) will be disposed within a compartment (22) which is located in the lower portion of hand-held card reader (10) as shown in FIG. 2b. Electrical power source (20) may or may not be removable.

Figure 5:
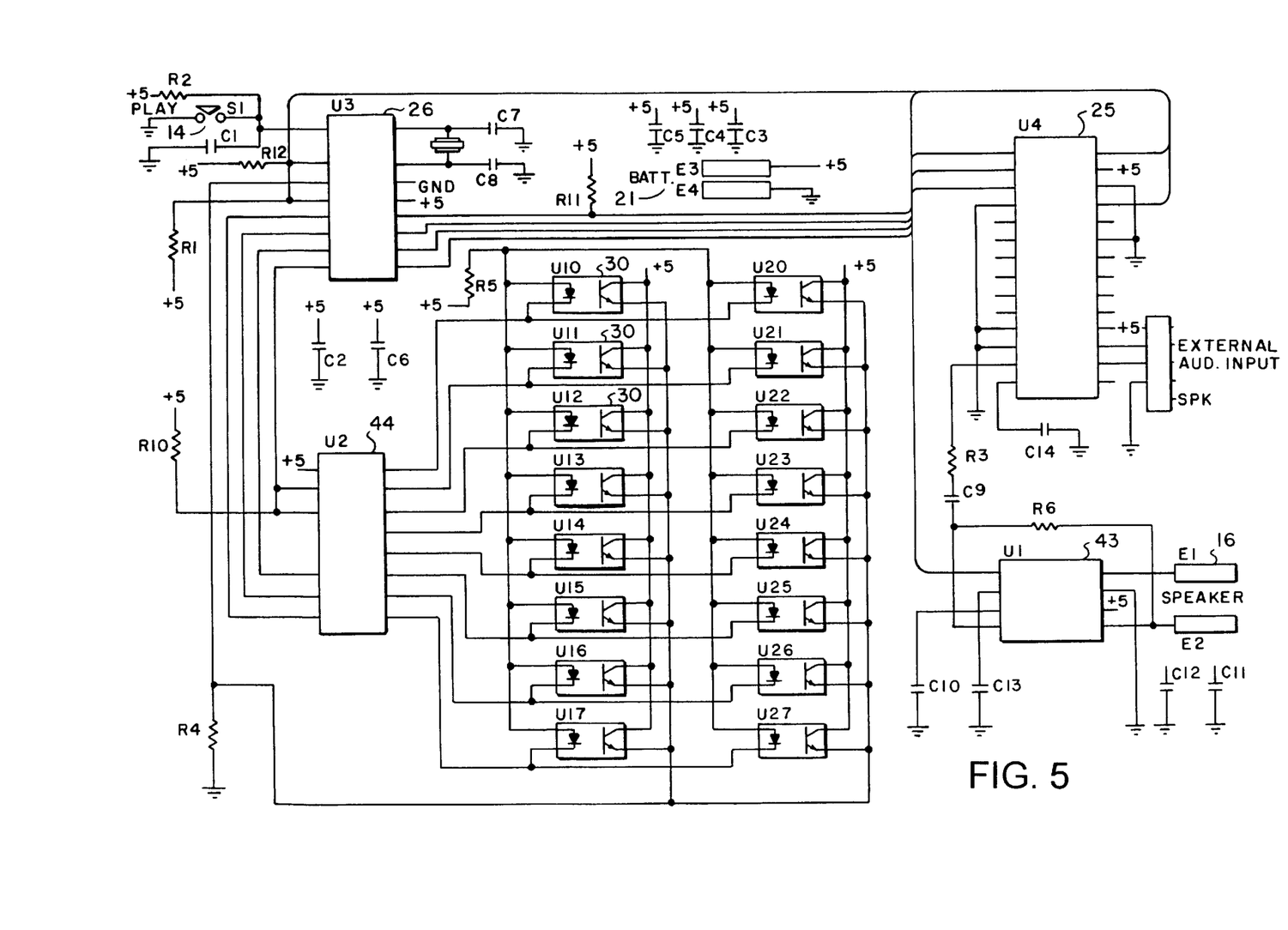
FIG. 5. Circuit diagram for a third embodiment of the hand-held talking card of the invention. The card reader here does not have a removable non-volatile memory.

The circuitry of hand-held card reader (10) will vary according to whether or not a removable non-volatile memory is used and the individual electronic components used in the card reader. FIG. 5 depicts a circuit diagram for hand-held card reader having: sound chip (25) which includes a permanent non-volatile memory, speaker (16), plural electro-optical sensors (30), decoder (44), microprocessor (26), power source (21), audio amplifier (43) and activating switch (14). It should be noted that indicator (13) (not shown) and decoder (44) are optional. Decoder (44) will be required when microprocessor (26) has insufficient memory bits to control access and addressing of all of the electro-optical sensors (30) present in a given card reader. Other sound chips having more or less non-volatile memory can be used. Other microprocessors capable of controlling the operation of the card reader, as described herein, can be used. Other power sources, speakers, audio amplifiers, electro-optical sensors and decoders can also be substituted for those employed herein. The circuitry will also vary according to the number of electro-optical sensors (30) employed.

The electronic components of the invention are commercially available from a wide variety of sources such as Newark Electronics (Chicago, Ill.), Radio Shack (Ft. Worth, Tex.), DigiKey Corporation (Thief River Falls, N. Mex.), Mouser Electronics (Mansfield, Tex.), Motorola, Intel, NEC, Hitachi, Zilog, National, Information Storage Devices and the like.

The above is a detailed description of particular embodiments of the invention. Those with skill in the art should, in light of the present disclosure, appreciate that obvious modifications of the embodiments disclosed herein can be made without departing from the spirit and scope of the invention. All of the embodiments disclosed and claimed herein can be made and executed without undue experimentation in light of the present disclosure. The full scope of the invention is set out in the claims that follow and their equivalents. Accordingly, the claims and specification should not be construed to unduly narrow the full scope of protection to which the present invention is entitled.

What is claimed is:

1. An interactive card reading system comprising, in combination:
    a card bearing an image and encoded information; and
    a separate talking, single component card reader comprising:
        a housing having a surface defining a slot for receiving said card;
        a sound chip comprising a non-volatile memory for storing a prerecorded message associated with the image or encoded information borne by said card;
        a sound generating unit disposed within the housing for audible play-back of the prerecorded message associated with the image or encoded information borne by said card;
        an electro-optical reading unit disposed within said housing adjacent the surface defining a slot in said housing for reading the encoded information on said card;
        a control unit disposed within the housing and operably connected to said sound generating unit, said electro-optical reading unit, and said sound chip for decoding encoded information read by said electro-optical reading unit, for retrieving from said non-volatile memory the prerecorded message associated with the image or encoded information borne by said card and read by said electro-optical reading unit, and for initiating play-back of the prerecorded message by said sound generating unit; and
        an activating switch associated with said housing and operably connected to said control unit: and said housing having a permanent or removable portion which shape or appearance is associated with some aspect of the card being read.

2. The interactive card reading system of claim 1, wherein the card reader further comprises an additional non-volatile memory.

3. The interactive card reading system of claim 2, wherein said sound chip or said additional non-volatile memory is removable.

4. The interactive card reading system of claim 1, wherein said card reader further comprises an indicator for indicating an operation of the card reader.

5. The interactive card reading system of claim 1, wherein the encoded information on said card is encoded in binary format.

6. The interactive card reading system of claim 1, wherein the card has a substantially planar structure and is selected from a disc-shaped connector, pog, gaming card, trading card, price tag, inventory tag, ticket, receipt, game piece, business card, note card or collectible card.

7. The interactive card reading system of claim 1, wherein said electro-optical reading unit operates in the visible, ultraviolet or infrared wavelength ranges.

8. The interactive card reading system of claim 1, wherein said card reader further comprises an additional activating switch disposed adjacent or within the slot of said housing.

9. The interactive card reading system of claim 1, wherein said control unit comprises a microprocessor, discrete logic or direct mapping circuitry and non-volatile memory.

10. The interactive card reading system of claim 9, wherein said control unit further comprises a decoder.

11. A talking, single component card reader for reading encoded information on a card, the card reader comprising:
    a housing having a surface defining a slot for receiving a card;
    a sound chip comprising a non-volatile memory for storing a prerecorded message associated with the encoded information on a card;
    a sound generating unit for audible play-back of the prerecorded message;
    an electro-optical reading unit disposed within the housing adjacent the surface defining a slot for reading the encoded information on the card;
    an activating switch for initiating operation of said card reader; and
    a control unit operably connected to said sound generating unit, said electro-optical reading unit, said sound chip and said activating switch for decoding the encoded information on the card, for retrieving from said non-volatile memory the prerecorded message associated with the encoded information on the card, and for initiating play-back of the prerecorded message by said sound generating unit;
    said housing having a permanent or removable portion which shape or appearance is associated with some aspect of the card being read.

12. The talking, single component card reader of claim 11 further comprising an additional non-volatile memory.

13. The talking, single component card reader of claim 12, wherein said sound chip or said additional non-volatile memory is removable.

14. The talking, single component card reader of claim 11 further comprising an indicator for indicating an operation of the card reader.

15. The talking, single component card reader of claim 11, wherein said electro-optical reading unit operates in the visible, ultraviolet or infrared wavelength ranges.

16. The talking, single component card reader of claim 11 further comprising an additional activating switch disposed adjacent or within the slot of said housing.

17. The talking, single component card reader of claim 11, wherein said control unit comprises a microprocessor, discrete logic or direct mapping circuitry and non-volatile memory.

18. The talking, single component card reader of claim 17, wherein said control unit further comprises a decoder.

19. The talking, single component card reader of claim 11, wherein the slot of said housing has an associated recess to permit reading of cards of different shapes.

* * * * *